UNITED STATES PATENT OFFICE.

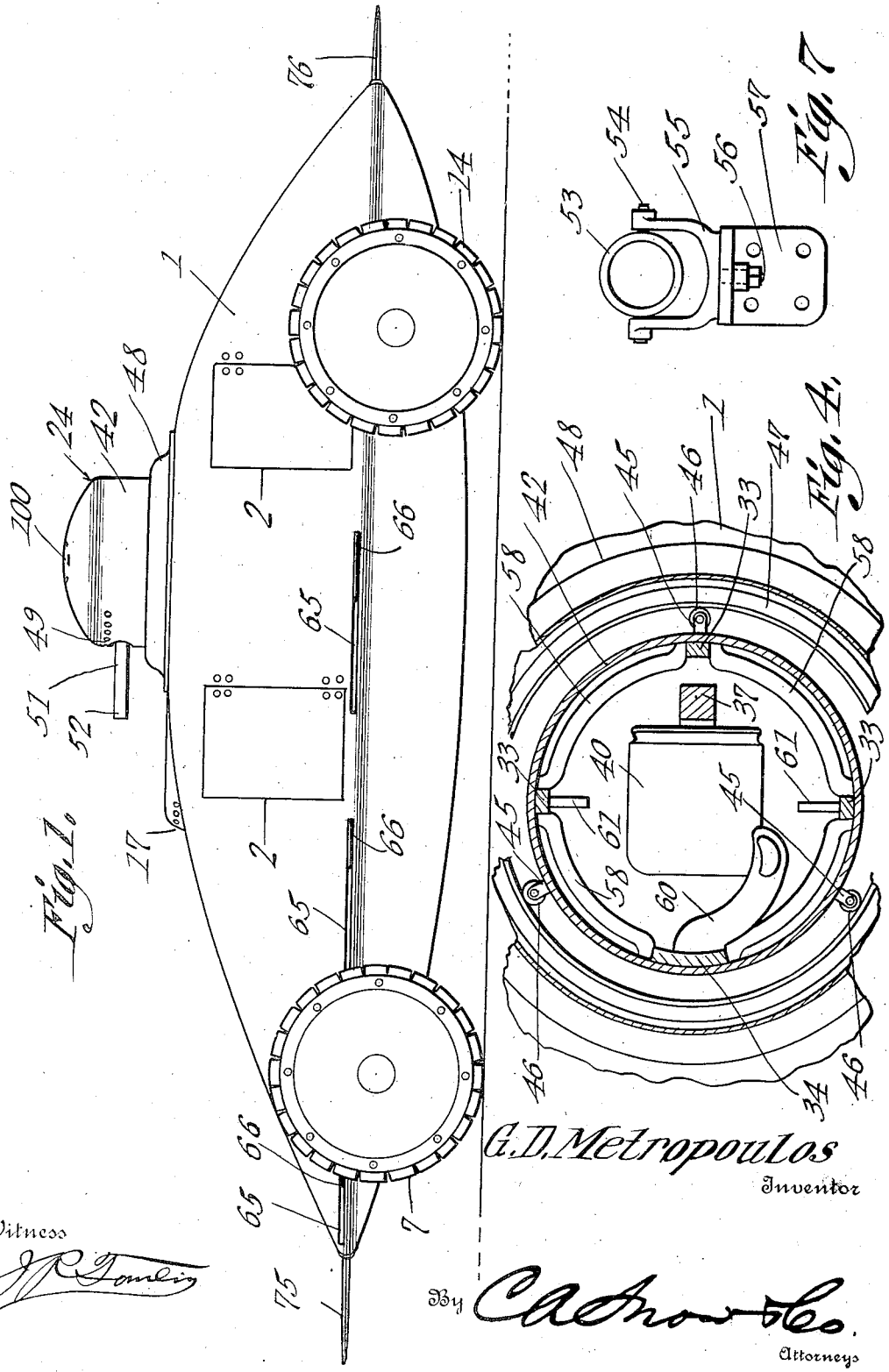

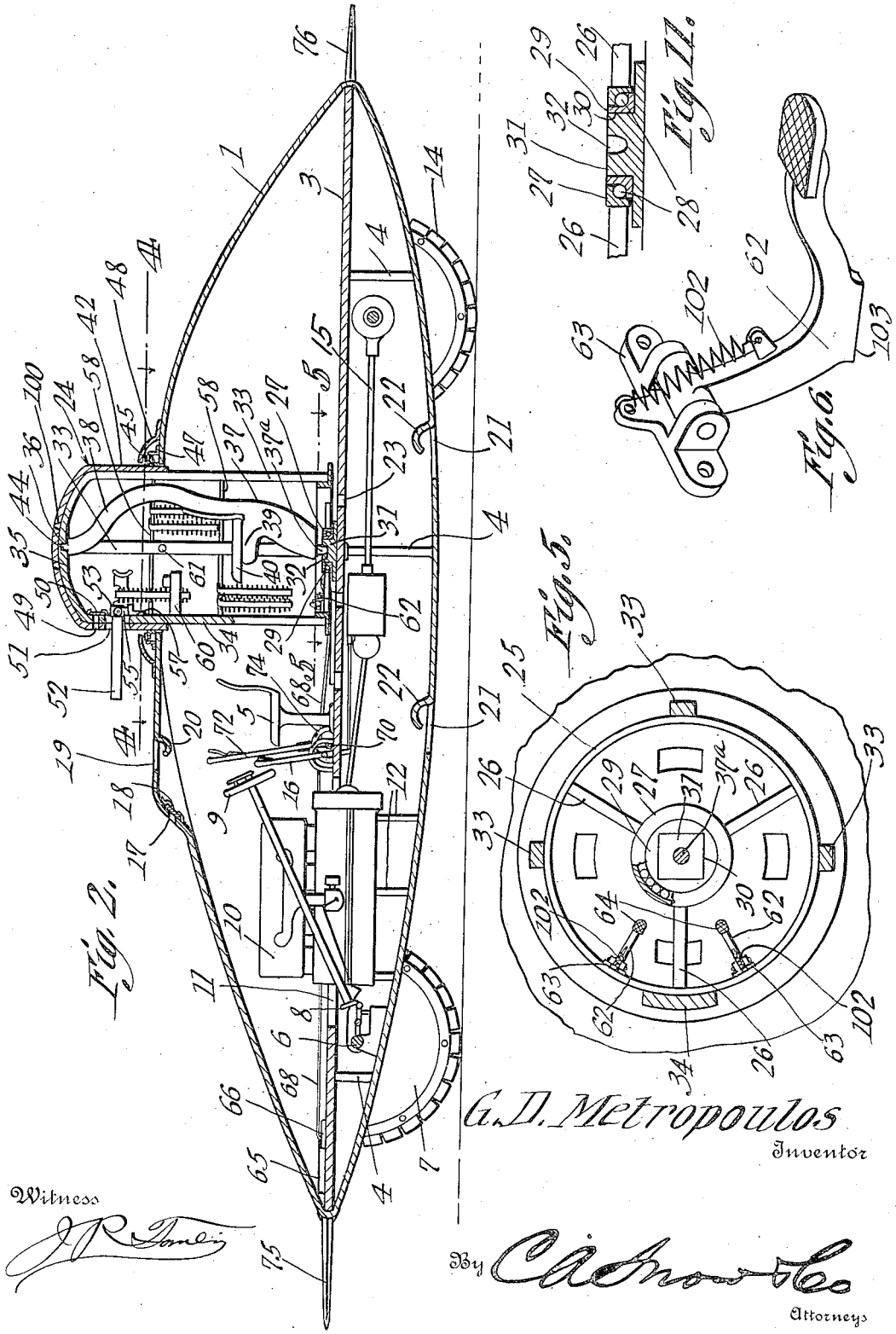

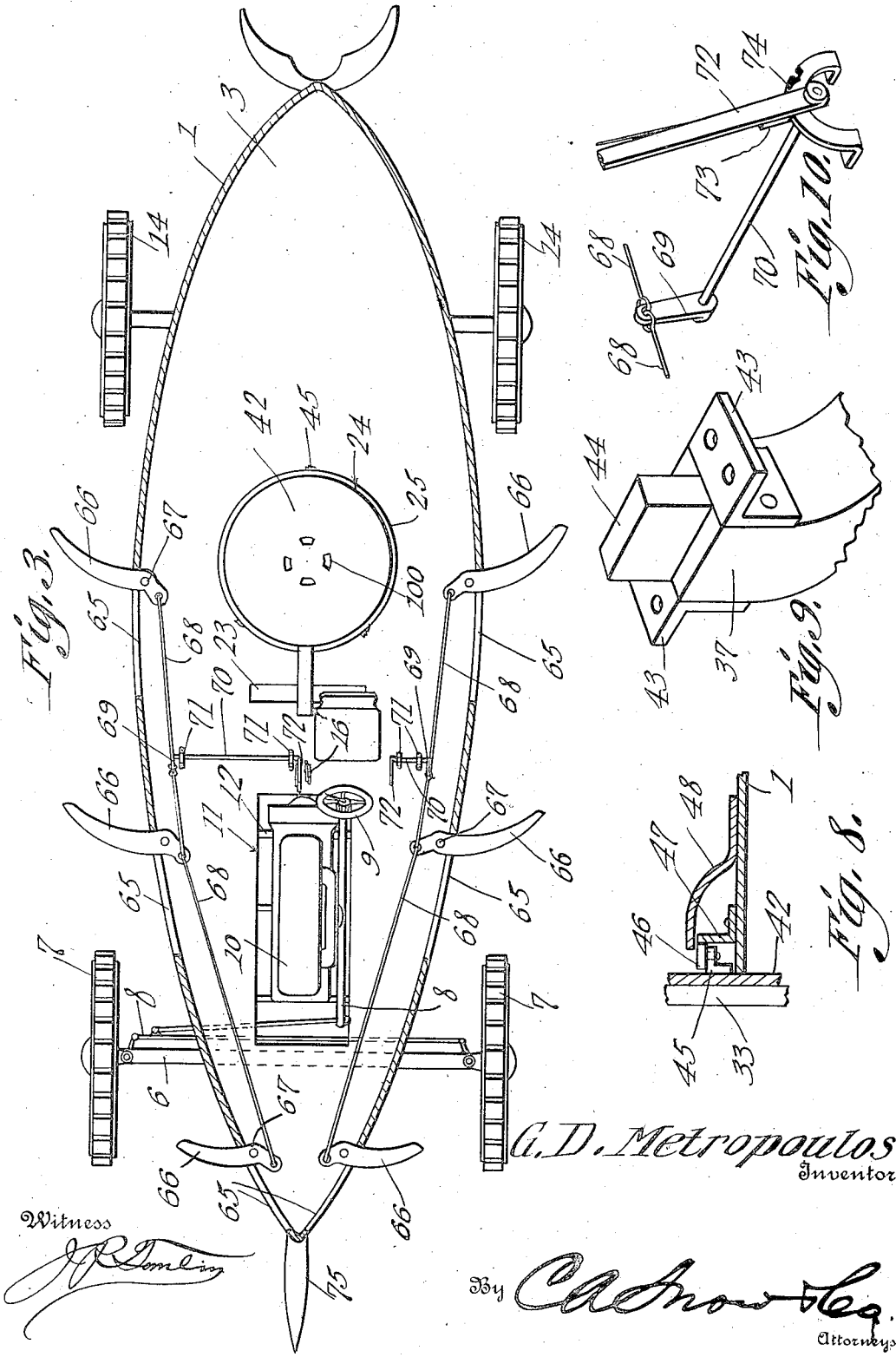

GEORGE D. METROPOULOS, OF BIRMINGHAM, ALABAMA.

WAR-VEHICLE.

1,318,898.  Specification of Letters Patent.  Patented Oct. 14, 1919.

Application filed September 17, 1918. Serial No. 254,454.

*To all whom it may concern:*

Be it known that I, GEORGE D. METROPOULOS, a citizen of the United States, residing at Birmingham, in the county of Jefferson and State of Alabama, have invented a new and useful War-Vehicle, of which the following is a specification.

The device forming the subject matter of this application is a motor propelled vehicle adapted to be used in time of warfare, and one object of the invention is to provide novel means for mounting a rotatable gun turret in such a way that it can be turned readily by a gunner within the turret. Another object of the invention is to provide novel means whereby blades may be advanced at the sides of the vehicle for the purpose of cleaving down the enemy during a charge.

I have shown but one form of my invention, and changes may be made therein, within the scope of the skill of a mechanic, without departing from the spirit.

In the drawings:—Figure 1 shows, in side elevation, a war vehicle constructed in accordance with the invention; Fig. 2 is a longitudinal section, wherein parts appear in elevation; Fig. 3 is a horizontal section taken through the body of the vehicle; Fig. 4 is a cross section on the line 4—4 of Fig. 2; Fig. 5 is a cross section on the line 5—5 of Fig. 2; Fig. 6 is a perspective disclosing one of the turret brakes; Fig. 7 is an elevation of the gun mount; Fig. 8 is a sectional detail depicting one of the means whereby the turret is prevented from swinging laterally; Fig. 9 is a perspective showing the means whereby the upper end of the supporting post for the turret is connected with the turret; Fig. 10 is a perspective delineating the means for operating the knives; and Fig. 11 is a sectional detail showing the means for limiting the lateral movement of the lower end of the turret.

The war vehicle claimed comprises an armored body 1, having entrance doors 2. A platform 3 is located within the body 1 and forms a part thereof, the platform being sustained on supports 4. There is a seat 5 on the platform 3. A front axle 6 is assembled with the body 1 and carries dirigible forward wheels 7 controlled by a steering mechanism 8 terminating in a hand wheel 9 accessible from the seat 5, which is a driver's seat. An engine 10 is located in front of the seat 5 and may extend through an opening 11 in the platform 3, the engine being supported at 12, in any suitable way, on the body 1. The rear wheels of the vehicle are shown at 14 and are operatively connected with the engine 10 by means of the driving mechanism 15, which is of any desired kind. The numeral 16 marks a lever controlling the engine 10, directly or indirectly, as is common in the art.

The forward portion of the body 1 is supplied with peep-holes 17 backed by strong transparent plates 18, and through these holes, the driver occupying the seat 5 may peer, in order to direct the course of the vehicle. The top of the body 1 may be supplied with ventilating openings 19, guarded by inwardly extended lips 20, so curved as to direct backwardly, out of the openings 19, bullets fired thereinto. There are ventilating openings 21 in the base of the body 1, guarded by lips 22 of the kind mentioned. The platform 3 has ventilating openings 23.

The vehicle comprises a gunner's turret denoted generally by the numeral 24 and located to the rear of the driver's seat 5, the turret being rotatable about a vertical axis. The turret 24 is a composite structure and includes a base ring 25 provided with spokes 26 carrying a ball race 27 coacting with balls 28 coöperating with a ball race 29 having a rectangular opening 30 receiving a thrust bearing 31 secured to the platform 3, the thrust bearing having a recess 32 in its top. The balls 28 prevent a lateral movement of the lower end of the turret 24. The base ring 25 carries standards 33 and 34, the standard 34 being somewhat wider than the other standards. The standards meet at the top of the turret, as shown at 35, and are provided at their point of meeting, with a recess 36. A post 37 is located in the turret 34 and is curved as at 38 to accommodate the back of the gunner when the gunner sits on a seat 40 carried by a shoulder 39 on the post 37. The lower end of the post 37 is supplied with a reduced stem 37ª journaled in the recess 32 of the thrust bearing 31. The upper end of the post 37 is squared as shown at 44 and is received against rotation, but loosely, in the recess 36 of the top portions 35 of the standards 33 and 34. There are brackets 43 on the upper end of the post 37, and the brackets may be connected to the part 35 which is common to all of the standards 33 and 34. A metal dome 42 is attached to the top portions of the standards 33 and 34, to rotate therewith, and extends downwardly into the top of the body 1, the dome being provided with ventilating perforations 100. The dome 42 carries a ring 45 on which rollers 46 are journaled to turn on vertical axes, the rollers coacting with an annular track 47 secured to the body 1 about the opening wherein the turret 24 rotates. The rollers 46 and the track 47 limit the lateral movement of the turret 24 when the turret rotates with the post 37. The track 47 and portions of the rollers 46 are overhung by an annular guard 48 on the body 1, the guard serving to protect the rollers and the track 47 from projectiles, the guard coacting with the rollers 46 to prevent the turret 24 from jumping upwardly. The turret 24 has peep holes 49 in its dome 42, some of these holes being disposed in the wider standard 34, the holes being backed by a strong transparent plate 50; in the dome 42 and in the standard 34 there is formed an opening 51 through which projects a weapon, which may be a machine gun 52 carried by a mount 53 mounted to swing at 54, horizontally, on a support 55 pivoted at 56, for swinging movement on a vertical axis, to a bracket 57 mounted on the standard 34. It will be seen that the gun 52 has practically a universal movement. The standards 33 and 34 are connected by shelves 58 on which the ammunition for the gun 52 may be hung. The exploded ammunition may be thrown backwardly into the compartment existing behind the turret 24 and above the platform 3. The standard 34 carries an inwardly projecting horizontally curved arm 60 and there are grips 61 which project inwardly from some of the standards 33. Brake levers 62 are fulcrumed on hangers 63 secured to the base ring 25 of the turret 24. The brake lever 62 is swung upwardly by a spring 102, but may be pressed downwardly when pedal pressure is applied to a foot plate 64 on the inner end of the lever, the intermediate portion 103 of the lever thus being made to bear upon the platform 3.

Openings 65 are fashioned in the sides of the body 1 and through the openings, blades 66 project. There may be any number of openings and blades, and the blades may be as long as desired. The blades are fulcrumed at 67, intermediate their ends, on the platform 3, the inner ends of the blades being pivoted to rigid connections 68, certain of which are pivoted to crank arms 69 on transverse shafts 70 journaled in bearings 71 on the platform 3. Levers 72 are attached to the inner ends of the shafts 70 and are located on opposite sides of the driver's seat 5. Latch mechanisms 73 on the levers coact with segments 74 on the platform 3. The forward end of the body 1 is equipped with a rigid front blade 75 and there is a rigid rear blade 76 on the hind end of the body 1, the blade 76 being of approximate crescent shape, if desired.

The driver occupying the seat 5, directs the movement of the vehicle and controls the engine 10. The gunner occupies the seat 40 on the post 37 and manipulates the gun 52. The gunner may brace himself against the arm 60 and may take hold of one of the grips 61, his foot being thrust against the platform 3. In this way, the post 37 and the turret 24 may be rotated together, so that the gun 52 may be shifted in azimuth.

The driver may rotate the shafts 70 by means of the levers 72, the crank arms 69 operating the connections 68, and the latter swinging the blades 66 inwardly or outwardly. The blades 66 may be locked in advanced or retracted positions, by engaging the latch mechanisms 73 with the segments 74. The blades 66 are swung outwardly during a charge, and will create obvious havoc and mortality among the enemy.

I claim:—

1. A war vehicle comprising a body; a gun turret; a post supporting the turret centrally for rotation, the ends of the post being in vertical alinement, and the intermediate portion of the post being offset to form a seat-back; and a seat carried by the post and coöperating with the back, the center of the seat being disposed in approximate alinement with the ends of the post.

2. In a device of the class described, a war vehicle comprising a body; a gun turret; a post having its upper end engaged with the turret for rotation along with the turret, the lower end of the post being journaled on the body; and a seat carried by the post, the turret being relatively light, whereby a person occupying the seat may, by foot-thrust, rotate both the post and the turret.

3. A war vehicle comprising a body; a gun turret; a post supporting the turret centrally for rotation on the body; a gunner's seat on the post; and a brake pedal fulcrumed on the turret and adapted to coact with the body to serve as a brake for the turret, the pedal being accessible to a person occupying the seat.

4. A war vehicle comprising a wheel-mounted body; blades fulcrumed intermediate their ends on the body; a connection uniting the inner ends of the blades; a shaft journaled on the body and provided at its outer end with a crank arm pivoted to the connection; and means carried by the inner end of the shaft for actuating the same.

In testimony that I claim the foregoing as my own, I have hereto affixed my signature in the presence of two witnesses.

GEORGE D. METROPOULOS.

Witnesses:
MASON B. LAWTON,
IVY E. SIMPSON.